Sept. 4, 1951     S. T. COULTER ET AL     2,566,555
APPARATUS FOR RECONSTITUTING DRIED POWDERS
Filed Nov. 21, 1947     4 Sheets-Sheet 4
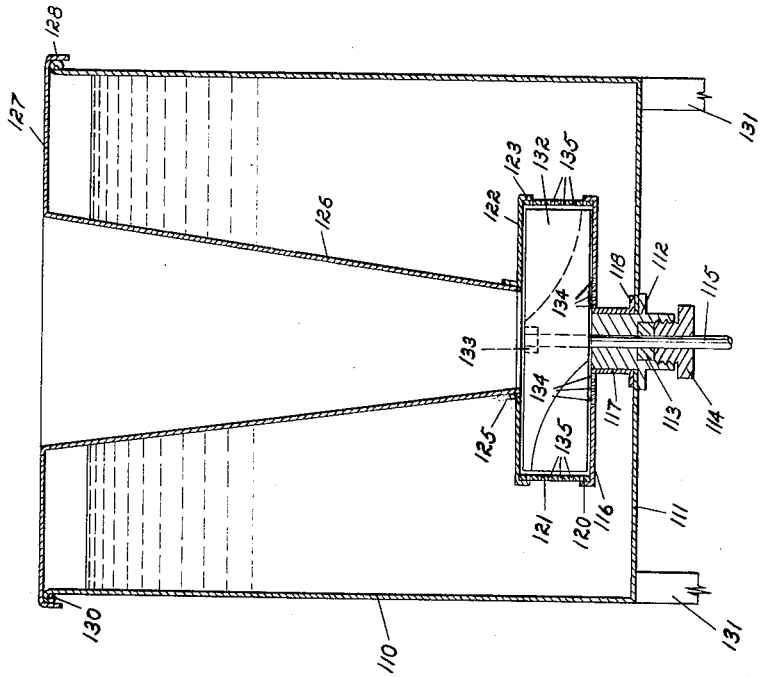
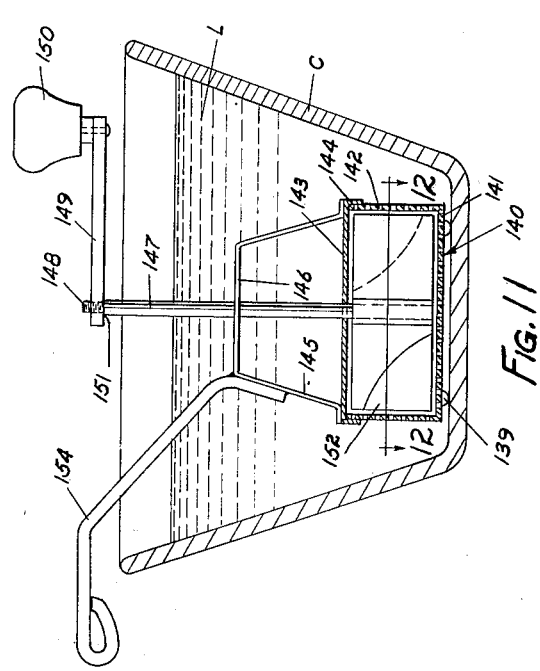
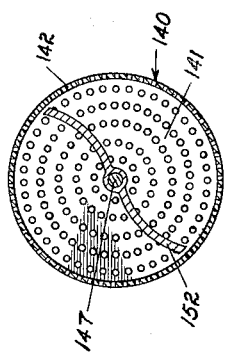
INVENTORS
SAMUEL T. COULTER
JOSEPH L. BECKER
BY Paul, Paul & Moore
ATTORNEYS Patented Sept. 4, 1951

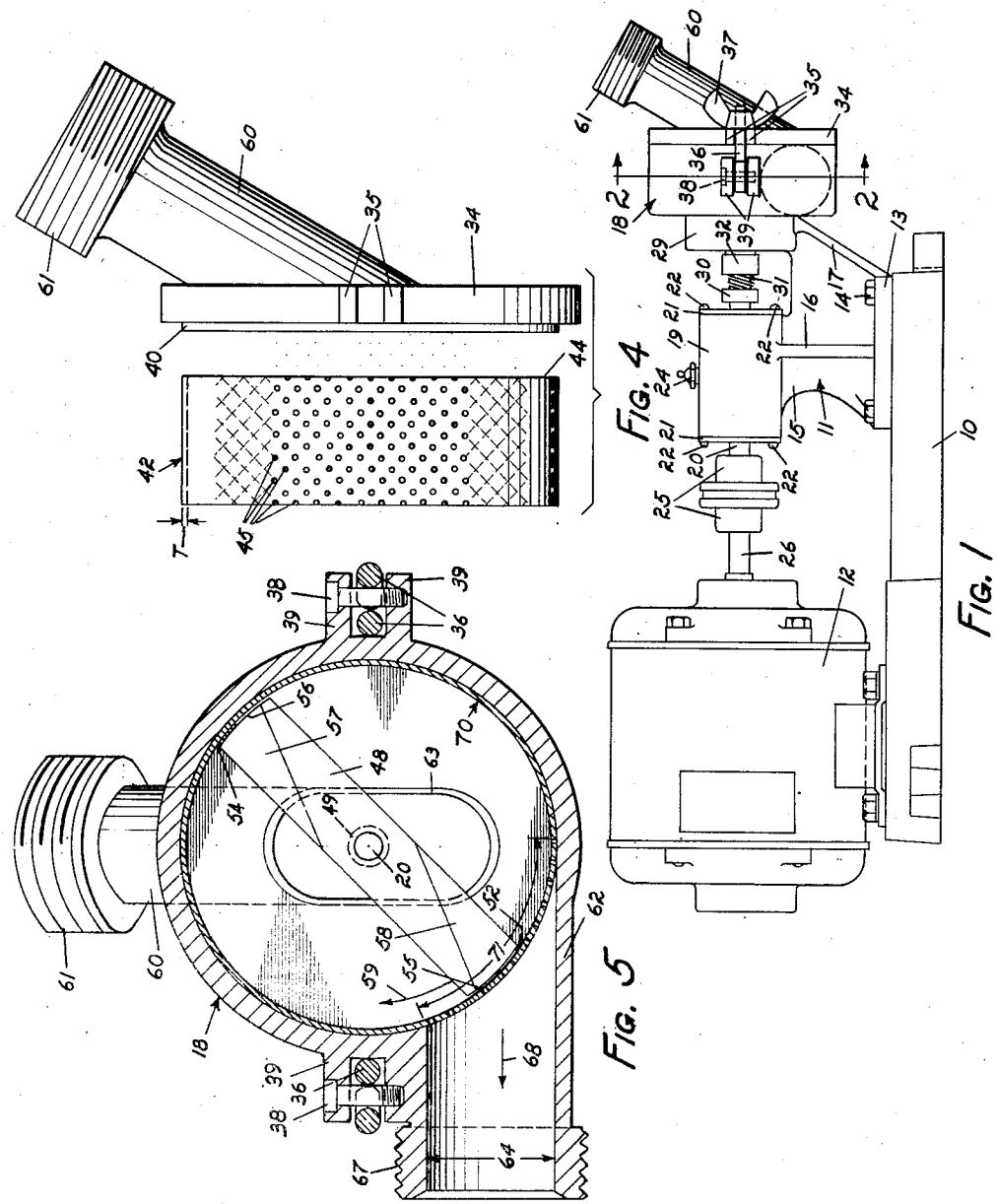

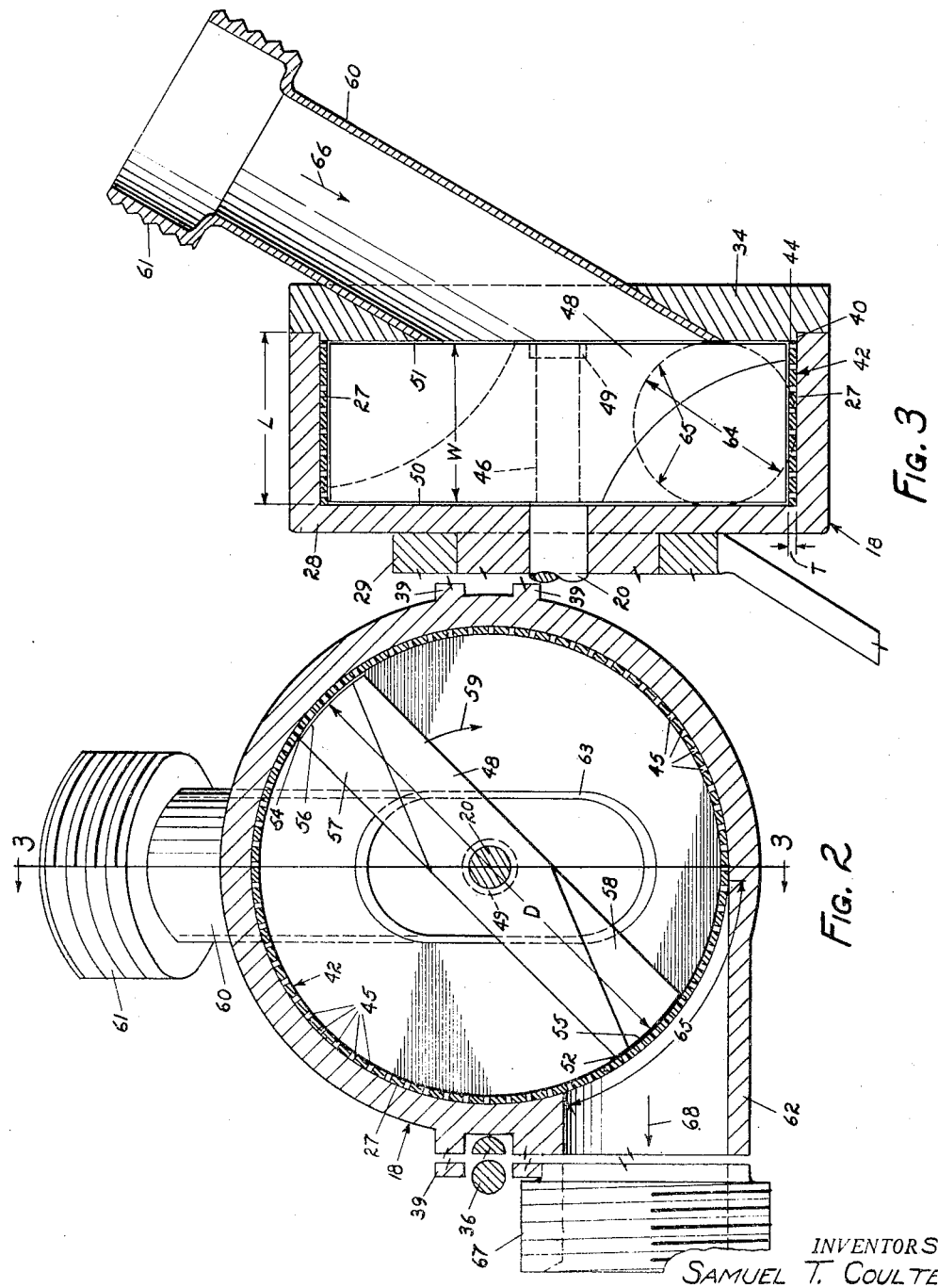

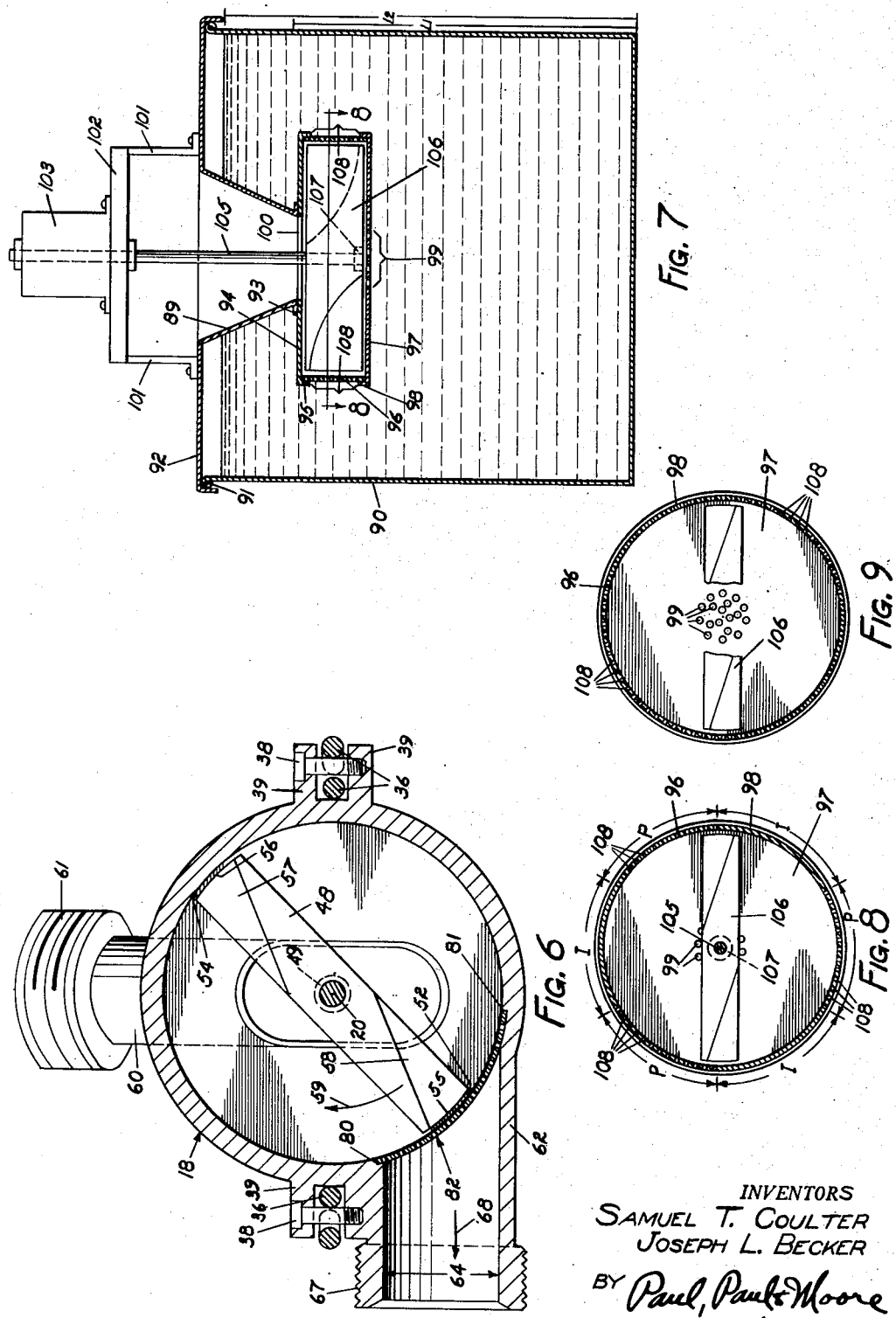

2,566,555

UNITED STATES PATENT OFFICE 2,566,555

APPARATUS FOR RECONSTITUTING DRIED POWDERS

Samuel T. Coulter, St. Paul, and Joseph L. Becker, Stillwater, Minn., assignors to Maple Island, Inc., a corporation of Minnesota Application November 21, 1947, Serial No. 787,330

19 Claims. (Cl. 259—10)

This application relates to an improved apparatus for reconstituting powders into solutions or dispersions and is particularly directed to apparatus for reconstituting dried milk powders as liquid milk.

In use of dried milk and other edible food powders it is disadvantageous to prepare the solutions or dispersions, as the case may be, much in advance of the time of use. Hence, the preparation of the solutions or dispersions is carried out frequently and they may be prepared in relatively small batches or large batches. This necessitates frequent cleaning and sterilization of the equipment. At the same time the solution or dispersion may be of small or large size up to several hundred gallons in many instances, and it is desirable to have adequate capacity for such contingencies, so that relatively large batches can be prepared, if desired.

What is most important the apparatus must prepare a complete dispersion or solution of the dried powder free from appreciable lumps or agglomerates of undissolved or undispersed powder.

Apparatus heretofore available has not been satisfactory because of its large size, expensive construction, inadequate operation, small capacity of general ineffectiveness. Thus, for dissolving dried milk powders in medium size batches, the apparatus heretofore available has been a large and expensive mixer or an impeller mixer. Using such a device, it takes about 45 minutes to one hour to prepare a batch of reconstituted milk from the requisite amounts of water and dried milk powder, regardless of the size of the batch.

It is an object of the present invention to overcome these difficulties and to provide an improved apparatus for preparing solutions or dispersions of dried powders and particularly to provide an improved device of small size, capable of being built and maintained economically, yet capable of effective operation at a high rate of capacity and of providing uniform fluid products whether the batch is large or small.

Other and further objects of the invention are those inherent in the apparatus herein illustrated, described and claimed.

The invention is illustrated in the drawings in which

Figure 1 is a side elevational view;

Figure 2 is an enlarged vertical sectional view taken in the direction of arrows 2—2 of Figure 1;

Figure 3 is an enlarged vertical sectional view taken in the direction of arrows 3—3 of Figure 2;

Figure 4 is a separated view of certain portions of the apparatus;

Figure 5 is an enlarged vertical sectional view corresponding to Figure 2 but showing a slightly modified form of the invention;

Figure 6 is an enlarged vertical sectional view like that shown in Figure 2, but illustrating a slightly modified form of the invention;

Figure 7 is a vertical sectional view showing a modified form of the invention;

Figure 8 is a horizontal sectional view taken in the direction of arrows 8—8 of Figure 7;

Figure 9 is a horizontal sectional view corresponding to that shown in Figure 8 showing a slightly modified form of construction;

Figure 10 is a vertical sectional view of a further modified form of the invention;

Figure 11 is a vertical sectional view of another form of the invention utilized especially for producing liquid dispersions or solutions of dried powders, such as fluid milk from dried milk powder; and Figure 12 is a horizontal sectional view taken in the direction of arrows 12—12 of Figure 11.

Throughout the drawings corresponding numerals refer to the same parts.

Referring to the drawings the apparatus comprises a base or frame 10 on which the apparatus of the invention generally designated 11 is mounted along with the motor 12 or other power source which serves to rotate the impeller of the apparatus 11. The device 11 comprises a suitable base plate 13 which is attached by means of bolts 14 to the base 10. The base plate 13 has a vertical flange 15 which is suitably stiffened at 16 and 17 so as to provide a rigid support for a bearing housing 19 and for the device 18 which serves to mix the dry powders and liquids. The bearing housing 19 is preferably provided with precision ball bearings which serve rotatably to support the shaft 20. The bearings are held in the housing 19 by end plates 21 which are fastened by screws 22. The bearing housing is preferably provided with a greasing connection at 24. The shaft 20 is connected by the coupling 25 to the shaft 26 of the motor 12.

The unit 18 is preferably cast integrally with the base 13 and the flange and supporting webs 15, 16 and 17. The unit 18 is of short cylindrical shape and has a cylindrical interior cavity 27 throughout the length L. The cavity 27 is closed by the end wall 28 which terminates in the gland housing 29. The shaft 20 carries a flange 30 which serves as a seat for spring 31 of the spring loaded gland 32. The housing 18 is open at the end and is arranged to be closed by an end plate 34 which has slotted ears 35 at each side to receive the draw-down bolts 36 provided with wing nuts 37. The bolts 36 are held by pins 38 which pass through the pairs of ears 39 on opposite sides of the housing 18. The bolts 36 can thus be swung out of the way so as to permit the end plate 34 to be removed from the housing 18. It is also possible to swing the bolts 36 into place and then by turning down the wing nuts 37 firmly to seat the end plate 34 onto the housing 18.

The end plate 34 is provided with a flange portion 40 which extends a short distance into the cylindrical bore 27 of the housing 18. The flange 40 seats against a cylindrical liner generally designated 42. Liner 42 is of thin sheet metal and is of perfectly cylindrical configuration so that it has a slip fit into the cylindrical bore 27 of the housing. The liner 42 has an axial length slightly less than the length L of the housing so that when the end plate 34 is pulled down onto the housing and the flange 40 thereof protrudes slightly into the bore 27, the flange will contact the edge of the liner at 44 and thus hold the liner firmly in place in the housing without, however, causing any buckling of the liner.

The entire surface of the liner 42 is perforated with a multitude of small apertures 45. In an exemplary installation in accordance with the present invention the liner was of corrosion resistant metal and had a thickness T of .024 inch and the apertures 45 had a diameter of .050 inch and were spaced .072 inch apart throughout the entire surface of the liner. It is to be understood, however, that the liner may be of other thicknesses and have apertures of different diameter and spacing without departing from the spirit of the present invention.

The shaft 20 extends into the cylindrical bore and has a portion of reduced diameter at 46 to receive an impeller 48 which is held in place by the nut 49 on the shaft 46. The impeller has a width W slightly less than the distance between the end plate 34 and the inner surface of wall 28 so as to leave only clearance at 50 and 51. The impeller diameter D is slightly less than the diameter of the cylindrical inner surface of the liner 42 so as to leave only slight clearance at 52 and 54 between the ends 55 and 56 of the impeller and the inner cylindrical surface of the liner 42. The impeller is preferably chamfered off at corners 57 and 58 so as to form a propeller shape which draws the liquid into the cavity when the propeller is rotated in the direction of arrow 59.

The end plate 34 is provided with a downwardly sloping inlet tube 60 having a coarse threaded end connection 61 to which a sanitary line may be easily connected. The tube 60 is firmly attached to the plate 34 and terminates at the port 63 centrally of the pump cavity. Hence, the incoming liquid and dry powder in unmixed condition is drawn into the cavity by the propeller action of the rotary impeller 48.

A tangential outlet of the housing 18 is provided at 62. The outlet tube 62 has a diameter 64 which is preferably only slightly less than the length L of the cylindrical cavity of the housing 18. The outlet pipe 62 terminates in a coarse thread 67 to which a sanitary outlet tube may readily be connected. The outlet port area 65 which is the termination of the outlet tube 62 in the housing 18 is completely covered by the liner 42.

In use the dry powder and the liquid which are to be thoroughly mixed into a solution or finely dispersed emulsion are preliminarily mixed in appropriate quantities in any suitable container which is connected to the inlet pipe 61. A suitable outlet tube is connected at 67. The motor 12 is then started and it serves to rotate the impeller 48 in the direction of arrow 59. The liquid and powder in unmixed condition flows in the direction of arrow 66 through the inlet pipe 60 and is drawn into the cavity of the housing 18 by the screw action of the impeller 48 due to the shape formed by the cut-away portions 58 and 57. The liquid and powder are then thoroughly mixed by the impeller 48 rotating in the cavity. The close clearance at 52 and 54 between the tips 55 and 56 of the impeller and the aperture at surface of the liner 42 causes an intense churning and shearing action upon the particles which causes them to be separated from each other and either dissolved in the liquid or completely dispersed therein (in the event the powder is of an insoluble type), and in addition the impeller action causes the liquid to be expelled through those apertures 45 which overlie the outlet port area 65, thus causing the mixed liquid to be discharged in the direction of arrow 68 through the outlet tube 62.

By way of illustration, a unit having an axial length L of $1\tfrac{8}{16}$ inches, thickness T of .024 inch and an internal diameter of member 42 of 3.95 inches and having holes 45 of a diameter of .050 inch uniformly distributed 169 holes per square inch of surface of element 45, and rotating at a speed of 1720 R. P. M. had a capacity of 20 gallons per minute of reconstituted whole milk using whole milk dry powder and liquid in appropriate quantities for the incoming flow through tube 60. By way of comparison a rotary type (Lightning) mixer in an open tank requires about 45 minutes to one hour for preparing a batch, regardless of the size of the batch, and the mixture so produced by such prior equipment is not as homogeneous and smooth as that produced by the apparatus of the present invention.

Referring to Figure 5 the apparatus is the same as that previously described except that the liner 70 is provided with apertures only throughout the port area 71, the remainder of the periphery of the liner 70 being smooth. The action is the same except that the capacity of the unit is somewhat reduced.

The liners 42 and 70 may be made of any suitable material. Thus, screen wire cloth of appropriate mesh may be utilized, if desired.

Referring to Figure 6 there is illustrated a form of the invention similar to that shown in Figure 5, except that in this instance the casing 18 is provided with recesses 80 and 81 extending axially across the casing so as to form a notch into which the perforated plate 82 which covers the outlet 64 may be placed. The perforated plate 82 is preferably normally curved to a radius which is greater than that of the housing 18. The plate 82 is then additionally flexed and is run into the grooves or notches 80 and 81 when the end cover 34 is off the housing. The resiliency of the plate 82 tends to return it to its original condition of lesser curvature and hence tightly holds the edges of the plate in the notches 80 and 81. The normal relaxed position of plate 82 must, of course, not be such as to reduce the clearance 52 so much that the tips of the impeller 48 would strike the plate. The apparatus shown in Figure 6 is otherwise the same as that shown in Figure 5.

Referring to Figure 7 there is illustrated a somewhat modified form of the invention in which the apparatus previously described is incorporated into a tank for holding the fluid during and after it is reconstituted with the dried powder. Thus, there is provided a tank 90 of any suitable capacity having a rolled or otherwise formed top edge 91. Onto the top edge there is fitted a cover 92 which has a downwardly converging central conical inlet 89. The lower flange 93 of the inlet is attached to the end cover 94 of the reconstituting unit, the cover 94 being flanged over at 95 to receive the cylindrical perforated cylinder 96 of the reconstituting unit. The opposite end plate 97 of the reconstituting unit is likewise flanged at 98 and may be fastened to the unit by bayonet connections or any other suitable fastening or clamping device. The cover plate 97 has a plurality of perforations in its central area indicated by the bracket 99, and the end plate 94, of course, has a large central opening 100 corresponding to the lower end of the conical inlet chute 89. Upon the cover there are provided upwardly extending legs 101 which serve to support the motor frame 102 carrying the motor 103. The motor is provided with adequate journals to support the downwardly extending motor shaft 105 upon which lower end of which there is removably mounted the impeller 106 which is held in place by the nut 107. The shape of the impeller is similar to that described with reference to Figures 1-6. In use liquid is put into the reservoir 90 until it reaches any level from $L_1$ to $L_2$, and the cover assembly 92 carrying the motor and the reconstituting apparatus, assembled as illustrated, is then placed onto the reservoir 90. Initially the water of the batch enters the pump unit through the apertures 99 and fills the entire unit to the water level. The motor unit 103 is then started and the action of the impeller 106 causes the water within the reconstituting housing composed of cylinder 96 and the end plates 94 and 97 to be thrown out through the apertures 108 in the cylinder 106. The impelling action also causes the water, which previously had been standing in the cone 92, to be drawn down and likewise thrown out through the apertures 108. During stable running conditions water enters through the apertures 99 and is discharged through the apertures 108 and the entire liquid content of the cone 89 is drawn down to the level of the impeller 106. With the motor thus operating, dry powder is ladled into the cone 89 and falls directly onto the impeller 106 where it is thoroughly mixed with the liquid in the reconstituting housing and is dispersed out through the openings 108 of the housing. Powder is added continuously until the requisite quantity has been added to produce the concentration of the dispersion or solution desired. It may be noted that throughout the time that the apparatus is running, the fluid of the housing 90 is being drawn into the ports 99, and thus, being repeatedly mixed with incoming powder, is repeatedly passed through the reconstituting unit, thus insuring a thorough and homogeneous dispersion or solution, depending upon the solubility of the dry powder used.

Figures 8 and 9, which may be considered as representative of the cross section 8—8 of Figure 7, illustrate the pattern of apertures 108 which may be used. In Figure 8 there are three zones indicated by the dimension P throughout which the cylindrical housing 96 is perforated. These zones are evenly spaced and are separated by the imperforate zones indicated by the dimension lines I. Any desired number of zones of perforate and imperforate area may be utilized, three to four such perforate zones separated by imperforate zones is preferred, although any number of such zones may be utilized. Or, if desired, the entire circumference of the cylinder 96 may be perforated as shown in Figure 9 in which the perforations 108 are carried entirely around the cylinder 96.

Referring to Figure 10 there is illustrated a form of the invention similar to that shown in Figures 7-9, except that the power is supplied from the bottom of the vessel rather than from the top, as shown in Figure 7. Thus, in Figure 10 the vessel 110 has a bottom 111 which is centrally apertured to receive the bearing block 112 having a packing 113 for a gland nut 114 through which the impeller shaft 115 passes. The bearing 112 protrudes inwardly within the vessel and serves as a central mounting box on which the lower end cover 116 of the reconstituting housing is mounted by means of its own axial central flange 117 and 118. The end plate 116 has an edge flange 120 which serves to locate the perforated cylindrical body 121 of the reconstituting housing. The upper end plate 122 likewise has a flange 123 which rests upon the cylinder 121. The upper end plate 122 also has an upwardly extending conical flange 125 into which the downwardly extending conical feed pipe 126 extends and by which it is located. The feed pipe 126 is a part of the cover 127 which has the locating flange 128 at its upper edge so as to fit over the rolled beading 130 of the vessel 110. The vessel 110 is supported on any suitable frame or by means of legs 131, and the shaft 115 is driven either by a belt or by a motor directly connected thereto. The shaft 115 is provided with an impeller 132 which is removable but is held in place during operation by the end nut 133.

The lower end plate 116 is provided with a plurality of apertures 134 which are in an annular path around the central tubular flange 117. The cylindrical shell 121 is likewise provided with apertures 135 either throughout its periphery as shown in Figure 9 or in a plurality of separated zones as shown in Figure 8.

The operation of the apparatus shown in Figure 10 is similar to that shown in Figure 7. In assembling the apparatus it may be assumed that all of the parts are separated and that merely the shaft 115 protrudes through the bearing 112. The end cover plate 116 is first inserted over the bearing box and is frictionally held thereto, and the impeller 132 is placed on the shaft and held by a suitable nut. The cylindrical portion 121 is then centered and nested in the flange 120, and the upper end plate 122 is then placed on and the cover 127, together with the conical inlet pipe 126, are then settled into place in the flange 122. Thus, the entire reconstituting assembly can be made very quickly and easily without anything more than frictional attachment between the various parts. Water in the quantity desired is then dumped into the cone 126 and as it runs through the reconstituting unit, it fills the tank 110 and the cone 126. The drive is then started and the impeller 132 draws the water from the cone 126 downwardly and ejects it through the apertures 135. A stabilized condition is reached at the operating speed, at which time water is drawn through the apertures 134 and from the cone 126 and is forced through apertures 135 along with a certain amount of air which enters through the cone 126. With the apparatus thus operating the dry powder to be reconstituted is ladled into the cone 126 and falls directly onto the impeller 132 where it is thoroughly mixed with the water being drawn in through the apertures 134 and the mixture is then forced out through the apertures 135. This action continues as more and more powder is ladled in until the desired consistency of the solution or dispersion is attained.

Referring to Figures 11 and 12 there is illustrated a small household size apparatus for reconstituting small batches of dry milk powder. The unit consists of a small cup-shaped vessel generally designated 140 which has a bottom 141 and cylindrical sides 142. The bottom and sides are preferably perforated throughout their entire area. The bottom may be provided with embossings 139 which serve during operation of the device to space the bottom 141 slightly from the surface of any container C in which the unit is used. The cup 140 is provided with a perforate or imperforate cover 143 having a downwardly extending flange 144 all around which fits on the cylindrical portion 142 of the cup. The cover 143 has fastened thereto an upwardly extending bracket 145 which has a top part 146. The cover 143 and the top part 146 are apertured to receive the shaft 147 which is provided with screw threads 148 at its upper end to receive the screw on the handle 149 which has a knob 150. As the handle is turned in, preferably, the right-hand direction, the part 149 is screwed onto the threads 148 until they bottom on the shoulder 151 whereupon the shaft 147 is then turned. Within the shell formed by the cup 140 and the cover 143 there is an S-shaped impeller 152 which is riveted or otherwise attached to the lower end of the shaft 147. The entire apparatus may be disassembled very easily by screwing the handle 149 off the shaft 147, whereupon the shaft may be withdrawn from the cover-bracket assembly 143—145 and the cover may be disassembled from the cup 140. In use, however, the cover 143, shaft 147 and handle 149 are removed as a sub-assembly from the cup 140 and one or two tablespoonfuls or more, as desired, of dry milk powder or other powder to be reconstituted are introduced into the cup 140 and the cover handle and impeller assembly is then again placed on the cup and the entire unit is immersed in an appropriate quantity of liquid L in the household vessel C. The handle 149 is then turned rapidly for 15 or 20 seconds which is all that is necessary for reconstituting a powder such as dried milk.

If desired, the unit may be formed having thereon a handle 154 by which the under water elements may be steadied while handle 150 is turned during the reconstituting operation. Where it is desired to produce a more concentrated solution or dispersion than can be accomplished by the amount of powder held in the cup 140, it is only necessary to remove the unit from the partially prepared batch, open it and then introduce additional powder. The unit is then reassembled and again submerged in the batch and the handle again turned to produce a uniform and homogeneous batch of increased concentration.

As many apparently widely different embodiments of this invention may be made without departing from the spirit and scope thereof, it is to be understood that we do not limit ourselves to the specific embodiments herein except as defined by the appended claims.

What we claim is:

1. An apparatus for mixing solid powders and liquids comprising a centrifugal pump having a stationary housing having an inlet and an outlet, an impeller journaled for rotation therein, a liner fitted snugly into the housing so as to cover the outlet, said liner being disposed immediately adjacent the path of travel of the outer surface of the impeller and being perforated so as to present a plurality of holes at said outlet to permit flow therethrough due to the impeller action.

2. The apparatus of claim 1 further characterized in that the liner is perforated throughout its periphery including that portion over said outlet.

3. The apparatus of claim 1 further characterized in that the axis of rotation of the impeller is substantially upright and that an inlet comprising a substantially upright tube is connected thereto adjacent said axis.

4. The apparatus of claim 1 further characterized in that the housing is a perforated cup, having a removable cover formed with journal supports for a shaft to which the impeller is attached.

5. The apparatus of claim 4 further characterized in that the shaft is provided with a handle for hand rotation.

6. An apparatus for mixing solid powders and liquids comprising a vessel, a centrifugal pump assembly within the vessel and supported thereon and having a housing and an impeller therein mounted on a shaft so as to be rotated, at least a portion of the housing being adjacent the outer limits of the path of travel of the impeller, said portion being perforated to permit ejection of fluids therethrough due to impeller action, a fluid inlet into the housing adjacent the axis thereof and a solid-material inlet into said housing comprising a downwardly extending tube terminating at the housing adjacent the axis thereof and means for rotating the shaft.

7. The apparatus of claim 6 further characterized in that the centrifugal unit and means for rotating the shaft are mounted on a cover for the vessel.

8. The apparatus of claim 6 further characterized in that the vessel is provided with a bearing extending through the bottom thereof with the shaft extending therethrough, the centrifugal assembly housing being mounted on said bearing.

9. An apparatus for mixing solid powders and liquids comprising a stationary casing having a cylindrical interior surface and having closed ends, at least one of said ends being mounted for easy removal from the cylindrical casing portion, said casing having an outlet port, a liner fitted into the housing so as to be removable therefrom and to cover at least the outlet port when in the housing, said liner being provided with many small apertures at least throughout that portion overlying the outlet port, a downwardly sloping inlet connection through one of the ends of the casing, an impeller shaft extending axially into the casing through one of the end walls and an impeller on said shaft, said impeller having tips which rotate with slight clearance from the inside surface of the cylindrical liner.

10. An apparatus for mixing solid powders and liquids comprising a casing having a cylindrical interior surface and having closed ends, at least one of said ends being mounted for easy removal from the cylindrical casing portion, said casing having a cylindrical liner of a length and diameter so as to fit neatly with a sliding fit in said casing and so as to be easily removable for cleaning, said casing having an outlet port over which the liner fits when the liner is in the casing, said liner being provided with many small apertures at least throughout that portion overlying the outlet port, a downwardly sloping inlet connection through one of the ends of the casing, an impeller shaft extending axially into the casing through one of the end walls and an impeller on said shaft, said impeller having tips which rotate with slight clearance from the inside surface of the cylindrical liner.

11. The apparatus of claim 10 further characterized in that the casing has one end solidly attached thereto, and the opposite end is easily removable to present an opening through which the liner can be removed axially.

12. The apparatus of claim 11 further characterized in that the impeller shaft extends into the casing through the solidly attached end wall but does not extend through the removable end wall, and the downwardly sloping inlet connection is formed on the removable end wall.

13. The apparatus of claim 12 further characterized in that the inlet connection terminates in a port in the end wall at the axis of the casing.

14. The apparatus of claim 10 further characterized in that the cylindrical liner has small apertures throughout its surface.

15. The apparatus of claim 10 further characterized in that the removable end of the casing serves to clamp the cylindrical liner in place in the casing.

16. An apparatus for mixing solid powders and liquids comprising a casing having a short cylindrical bore closed at one end and open at the other end, a tangential outlet from the cylindrical bore terminating in a port in the cylindrical wall of the casing, a cylindrical sleeve having a diameter such that it slips snugly into the cylindrical bore of the casing and a length such that it covers the interior surface of the cylindrical bore, said cylindrical liner being apertured with a large number of small apertures throughout its area, a removable end for the casing having a portion to press against the end of the cylindrical sleeve and hold the same within the cylindrical bore when the removable end is in place on the casing, means for holding the removable end on the casing, a downwardly sloping inlet pipe on the removable end and terminating as an inlet port near the center of the casing end wall, a shaft extending axially through the closed end of the casing and having an impeller thereon, said impeller having tips terminating close to the interior surface of the cylindrical liner.

17. An apparatus for mixing small quantities of wettable powders with fluids comprising a cup-shaped casing having a wall and bottom having a slip fitted cover for containing the powder to be mixed, a bracket having a handle thereon attached to the cover for supporting it and the casing on which the cover is slip-fitted, a shaft having a hand crank thereon extending through the bracket and cover into the casing, said casing being completely closed except that it is perforated around at least a portion of the wall and bottom thereof, an impeller vane on that portion of the shaft which is within the casing, said impeller having tips rotatable closely adjacent the perforated wall of the casing.

18. The apparatus of claim 17 further characterized in that the shaft is attached to the hand crank by screw threads which tighten as the shaft is turned.

19. The apparatus of claim 17 further characterized in that the cup is made from perforated sheet.

SAMUEL T. COULTER.
JOSEPH L. BECKER.

REFERENCES CITED

The following references are of record in the file of this patent:

UNITED STATES PATENTS

| Number | Name | Date |
| --- | --- | --- |
| 679,046 | De Camp | July 23, 1901 |
| 711,688 | Williams | Oct. 21, 1902 |
| 1,031,666 | Richmond | July 2, 1912 |
| 1,689,103 | Bendixen | Oct. 23, 1928 |
| 1,990,960 | Schierer | Feb. 12, 1935 |
| 2,122,658 | Preston | July 5, 1938 |
| 2,199,729 | Peterson | May 7, 1940 |
| 2,240,213 | Fromm | Apr. 29, 1941 |
| 2,245,632 | Winkler | June 17, 1941 |
| 2,247,439 | Hawes | July 1, 1941 |